United States Patent
Deyle

(10) Patent No.: US 9,537,515 B2
(45) Date of Patent: *Jan. 3, 2017

(54) ANTENNA SHARING IN MOBILE DEVICES FOR BACKSCATTER RADIO

(71) Applicant: Google Inc., Mountain View, CA (US)

(72) Inventor: Travis Deyle, San Jose, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/044,865

(22) Filed: Feb. 16, 2016

(65) Prior Publication Data

US 2016/0164548 A1    Jun. 9, 2016

Related U.S. Application Data

(63) Continuation of application No. 14/330,802, filed on Jul. 14, 2014, now Pat. No. 9,312,950.

(51) Int. Cl.
| | |
|---|---|
| *H04B 5/00* | (2006.01) |
| *H04B 1/00* | (2006.01) |
| *H04B 7/26* | (2006.01) |
| *H01Q 1/22* | (2006.01) |
| *H04L 27/34* | (2006.01) |
| *G06K 7/10* | (2006.01) |

(52) U.S. Cl.
CPC .......... *H04B 1/0064* (2013.01); *H01Q 1/2208* (2013.01); *H04B 5/0062* (2013.01); *H04B 7/26* (2013.01); *H04L 27/3405* (2013.01); *G06K 7/10326* (2013.01)

(58) Field of Classification Search
CPC ....... H02J 7/025; H04B 5/0031; H04B 5/0081
See application file for complete search history.

(56) References Cited

U.S. PATENT DOCUMENTS

| | | |
|---|---|---|
| 6,590,498 B2 | 7/2003 | Helms |
| 7,825,774 B2 | 11/2010 | O'Toole et al. |
| 8,260,241 B1 | 9/2012 | Hyde |
| 8,682,261 B2 | 3/2014 | Ozaki et al. |
| 8,698,656 B2 | 4/2014 | Henty |

(Continued)

FOREIGN PATENT DOCUMENTS

EP     1 467 314     10/2004

OTHER PUBLICATIONS

Liu, V. et al., "Ambient Backscatter: Wireless Communication Out of Thin Air", University of Washington, http://abc.cs.washington.edu/files/comm153-liu.pdf, Last accessed Jun. 27, 2014, 13 pages.

(Continued)

*Primary Examiner* — David Bilodeau
(74) *Attorney, Agent, or Firm* — Blakely Sokoloff Taylor & Zafman LLP

(57) ABSTRACT

A method and apparatus for wirelessly communicating data that receives electromagnetic ("EM") radiation incident upon an antenna of a mobile device from a base station is described. The antenna is an element of the mobile device that serves an additional purpose than just as a reflective antenna for backscatter communications. A radar cross-section of the antenna is modulated between two or more states using a backscatter tag coupled to the antenna. Data is encoded onto a backscatter channel of the EM radiation via the modulating. The data is transmitted to the base station over the backscatter channel.

19 Claims, 6 Drawing Sheets

(56) References Cited

U.S. PATENT DOCUMENTS

2004/0217865 A1    11/2004  Turner
2009/0121835 A1    5/2009  Borret et al.

OTHER PUBLICATIONS

Thomas, S. et al., "QAM Backscatter for Passive UHF RFID Tags", 4th IEEE International Conference on RFID (RFID), Apr. 2010, 5 pages.

Thomas, S. et al., "A 96 Mbit/sec, 15.5 pJ/bit 16-QAM Modulator for UHF Backscatter Communication", 6th IEEE International Conference on RFID (RFID), Apr. 2012, 6 pages.

Thomas, S. et al., "Quadrature Amplitude Modulated Backscatter in Passive and Semi-Passive UHF RFID Systems", IEEE Transactions on Microwave Theory and Techniques, vol. 60, Issue 4, Apr. 2012, 8 pages.

Thomas, S. et al., "Rich-Media Tags: Battery-Free Wireless Multichannel Digital Audio and Image Transmission with UHF RFID Techniques", 7th IEEE International Conference on RFID (RFID), Apr. 30, 2013, 6 pages.

Besnoff, J.S. et al., "Battery-Free Multichannel Digital ECG Biotelemetry using UHF RFID Techniques", 7th IEEE International Conference on RFID (RFID), Date of Conference: Apr. 30, 2013-May 2, 2013, 7 pages.

Thomas, S., "Modulated Backscatter for Low-Power High-Bandwidth Communication", Department of Electrical and Computer Engineering Duke University, May 2013, 208 pages.

Sample, A.P. et al. "Design of an RFID-Based Battery-Free Programmable Sensing Platform", IEEE Transactions on Instrumentation and Measurement, vol. 57, No. 11, November 2008, 8 pages.

Miller, G., "Scientists Put Backpacks on Dragonflies to Track Their Brains in Flight", Wired Magazine, Jun. 2013, http://www.wired.com/2013/06/dragonfly-backpack-neuron/, 3 pages.

ANTENNA SHARING IN MOBILE DEVICES FOR BACKSCATTER RADIO

CROSS-REFERENCE TO RELATED APPLICATION

The present patent application is a continuation of U.S. application Ser. No. 14/330,802, filed on Jul. 14, 2014, the contents of which are hereby incorporated by reference.

TECHNICAL FIELD

This disclosure relates generally to antenna sharing for mobile devices.

BACKGROUND INFORMATION

Mobile devices typically have small screens to match their compact form factors. These small screens are not amenable to sharing screen images with large audiences and are often too small to efficiently serve as a primary virtual desktop to execute word processing applications, spreadsheet applications, or the like. Display screens of smartphones have been trending larger, which negatively impacts battery life and is contrary to providing a compact form factor; however, these larger screens are still insufficiently large to perform many tasks in an efficient manner.

Currently, the only realistic way to stream data (e.g., display data, large media files, etc.) off a mobile device is via a wired connection, a WiFi radio, a Bluetooth radio, or a cellular radio. The wired connection frustrates the portability feature of a mobile device, while WiFi, Bluetooth, and cellular radios are inherently power hungry, thereby limiting the duration of their use. These techniques are poor solutions for battery-constrained mobile devices, if the data is streamed for prolonged periods of time. The addition of an antenna for new wireless transmitters into mobile devices is also a limiting factor due to tight space and weight constraints in this product category.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and methods of operation for sharing antennas with a backscatter radio in mobile devices are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
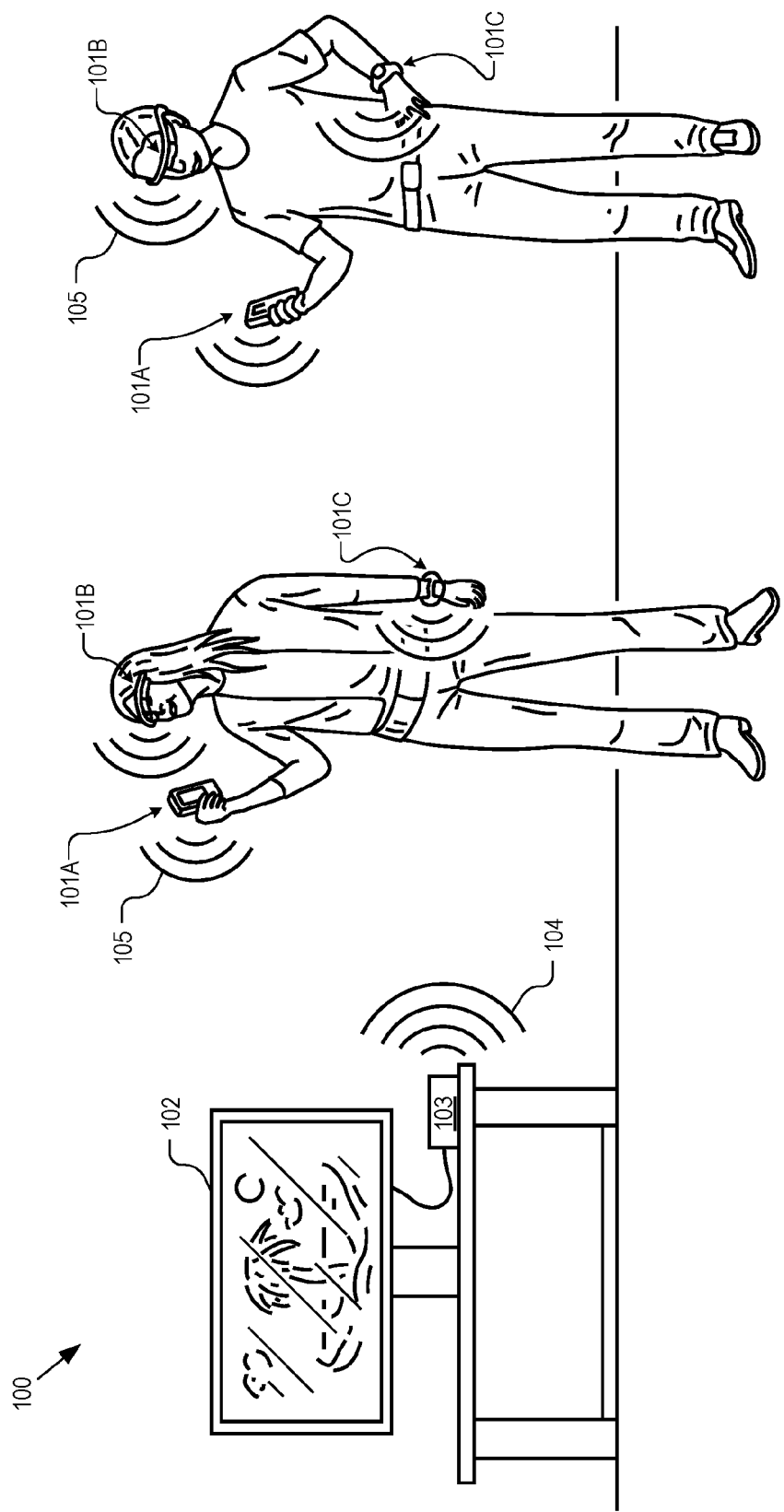
FIG. 1 illustrates an environment for streaming data from mobile devices to a base station, in accordance with an embodiment of the disclosure.

FIG. 1 illustrates an environment 100 for streaming data from one or more mobile devices 101 to a base station 103, in accordance with an embodiment of the disclosure. Environment 100 uses backscatter communications to provide a short range (e.g., up to 20 m), high bandwidth (e.g., 20 to 100 Mbps), and low power (e.g., less than 1 mW) wireless communication link to deliver data from mobile devices 101 to base station 103. The backscatter communication links described herein are well suited for transferring large media files such as video files, pictures, real-time streaming of a display screen image of the mobile device to display terminal 102, or otherwise.

The backscatter communication link is achieved by integrating backscatter tags (e.g., semi-passive RFID tags) into mobile devices 101. The design leverages asymmetric power budgets between wired base station 103 and mobile devices 101 to provide a low power solution on the mobile device side by relying upon the readily available power on the base station side.

Base station 103 includes one or more antennas that broadcast electromagnetic ("EM") radiation 104 towards mobile devices 101 and receive modulated backscatter reflections 105 of EM radiation 104. Modulated backscatter reflections 105 are referred to as the backscatter signal or backscatter channel. The backscatter tags integrated into mobile devices 101 do not transmit any RF or microwave power. Rather, they operate by modulating the reflections of EM radiation 104. The backscatter reflections are encoded with the data signals by modulating the radar signatures or radar cross-section of mobile devices 101 with data streams and base station 103 demodulates the received radar signatures reflected from mobile devices 101 to extract the embedded data. One technique for modulating the radar cross-section of mobile devices 101 is to modulate an impedance load coupled to the backscatter antenna on mobile device 101. This impedance modulation is a low power task when compared to an active transmitter such as WiFi, Bluetooth, or cellular radios. Since the backscatter tags are not actively transmitting, they are substantially unregulated, which makes them appealing in terms of changing technologies and are inherently backwards compatible as new standards or technologies arise. Most of the intelligence for operation of the backscatter channel can be embedded either in software on mobile devices 101 or in base station 103 and thus readily updateable.

Conventional RFID tags are fully passive devices that include no independent power source and harvest their energy for operation from EM radiation 104. However, energy harvesting from EM radiation 104 effectively slows the data rate of the backscatter channel, since the backscatter antenna will typically be optimized for harvesting power, not improving the signal-to-noise ratio ("SNR") of the backscatter channel. Additionally, fully passive RFID tags often pause for periodic power harvesting, which interrupts or delays data transmission. Energy harvesting reduces the read range for base station 103 because more incident EM radiation 104 is required to power up a backscatter tag than is required for the backscatter communications alone. Conventional fully passive backscatter tags employ slower data rates, as energy consumption on the backscatter tag is highly dependent on clock speed.

Embodiments of the backscatter tags embedded within mobile devices 101 are partially passive devices, which do not harvest energy from EM radiation 104. Rather, the backscatter tags are powered by the main battery of mobile devices 101. Since modulating the impedance load requires a modest power budget (e.g., 15 uW), the backscatter transmission does not impact battery life in a significant manner. In fact, in many cases, it will consume less energy to wirelessly stream a screen image off mobile devices 101 to base station 103 for display on display terminal 102, then powering the on-board display screens of mobile devices 101. Additionally, by not harvesting power from EM radiation 104, the backscatter antennas and modulation load impedances can be optimized for reflecting EM radiation 104 to improve SNR, reduce bit rate errors, and increase data throughput of the backscatter channel. By not harvesting power from EM radiation 104 to power the backscatter tag, embodiments disclosed herein can operate with higher clock rates and greater data throughput.

The limiting factor, in terms of range and bandwidth, for conventional fully passive RFID tags is the need to harvest energy. This power harvesting requirement dictates the design (size and shape) of the backscatter antenna to ensure adequate energy can be absorbed. By moving to a partially passive design where modulation of the radar cross-section of the backscatter antenna is battery powered, significant flexibility in antenna design is provided on the mobile device side. Accordingly, embodiments of mobile devices 101 described herein use existing elements within mobile devices 101 that serve other additional purposes as the reflective backscatter antenna. For example, these elements may be existing emission antennas coupled to active wireless transmitters (e.g., WiFi transmitter, Bluetooth transmitter, cellular transmitter, etc.) that are shared (e.g., time shared) with a backscatter tag. In some embodiments, these elements may be a conductive frame of mobile devices 101, a lead frame of a chip package within mobile devices 101, a conductive trace (e.g., power line or signal path) on a circuit board of mobile devices 101, or otherwise. In fact, almost any conductive element having a radar cross-section that can be modulated may serve a dual purpose as the backscatter antenna for reflecting EM radiation 104.

Using existing elements within mobile devices 101 to serve a dual purpose as the backscatter antenna provides significant flexibility for designers to incorporate backscatter tags for data communication into mobile devices 101. The weight and space constraints of compact mobile devices is a significant impediment for incorporating new or additional antennas into consumer products. Using a fully passive backscatter tag can require significant space being dedicated to an independent antenna. However, by forgoing power harvesting, the backscatter antenna requirements are significantly relaxed such that existing elements can be shared with a backscatter tag to serve a dual purpose including as the backscatter antenna.

EM radiation 104 may be broadcast using a variety of different carrier frequencies. For example, EM radiation 104 may operate on unencumbered frequencies such as 915 MHz, 2.45 GHz, 5.8 GHz, and 61.25 GHz. The backscatter tags may modulate the backscatter signal using a variety of techniques and symbol constellations for encoding the data signal onto the backscatter channel. For example, binary phase shift keying ("BPSK") or binary amplitude shift keying ("BASK") may be used. To achieve higher data rates, quadrature amplitude modulation ("QAM") may be used to modulate the load impedances applied to the backscatter antenna. Using higher carrier frequencies and larger QAM constellations (e.g., 16-QAM, 64-QAM, etc.) can achieve higher data rates (e.g., 100 Mbps). In some embodiments, the symbol constellation for encoding the data signal on the backscatter channel can be adaptively updated based upon the environment (e.g., noise, multi-path reflections etc.) and based upon the particular backscatter antenna being used at a given moment to improve throughput, improve SNR, or make the backscatter link less susceptible to degradation as a mobile device 101 moves through the environment.

Mobile devices 101 represent a variety of different devices, including mobile phones 101A, head wearable displays 101B, smart wrist watches 101C, tablets, laptops, body-mountable devices, body implantables, or other mobile devices operating with limited power budgets. Embodiments disclosed herein provide a backscatter channel having sufficient bandwidth to support high bandwidth data streams, such as a video streams, virtual desktops, or otherwise, from mobile devices 101 to base station 101. Base station 101 may be coupled to network (e.g., local area network or Internet) to stream the data to a remote location and/or coupled to display terminal 102 to display the data on a remote screen. Display terminal 102 may represent a television in a user's home, a projection screen in a conference room, a computer monitor, or otherwise. In the illustrated embodiment, base station 103 is a standalone box that outputs the screen image to display terminal 102 using a standardized video cable (e.g., HDMI cable, VGA connector, S-video cable, composite video cable, component video cable, etc.). In other embodiments, base station 103 may be integrated into display terminal 102, a set-top box, or various other consumer products.

Figure 2:
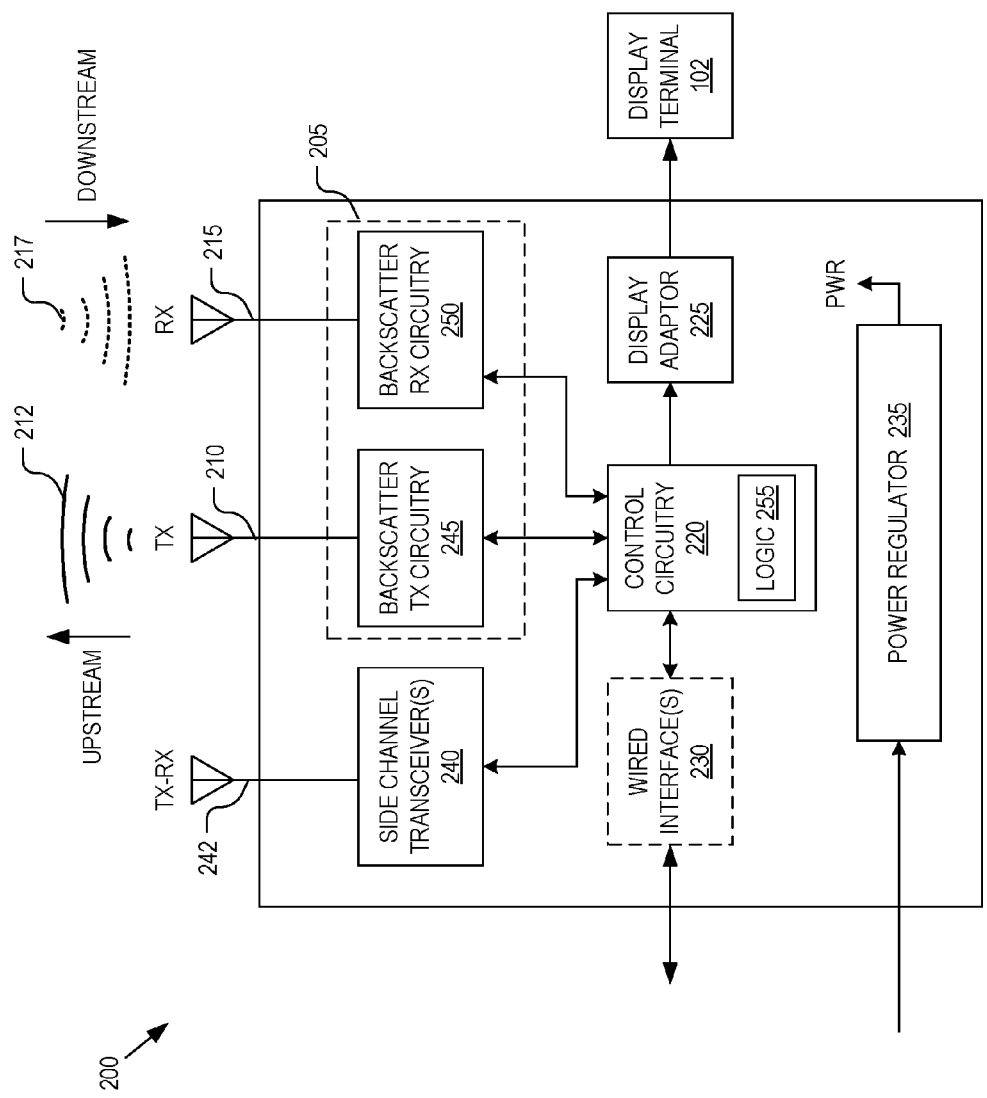
FIG. 2 is a functional block diagram illustrating a base station for wirelessly streaming data from a mobile device, in accordance with an embodiment of the disclosure.

FIG. 2 is a functional block diagram illustrating a base station 200 for wirelessly streaming data from a mobile device, in accordance with an embodiment of the disclosure. Base station 200 is one possible implementation of base station 103 illustrated in FIG. 1. The illustrated embodiment of base station 200 includes a backscatter transceiver 205, backscatter antennas 210 and 215, control circuitry 220, a display adaptor 225, wired interface(s) 230, a power regulator 235, side channel transceiver(s) 240, and one or more side channel antenna(s) 242. The illustrated embodiment of backscatter transceiver 205 includes backscatter transmit circuitry 245 and backscatter receive circuitry 250. The illustrated embodiment of control circuitry 220 includes logic 255. FIG. 2 illustrates functional components of base station 200 and not necessarily structural layout. It should be appreciated that the various components of base station 200 may be implemented entirely in hardware, entirely in software/firmware, or using a hybrid of both software/firmware and hardware.

Backscatter transceiver 205 is the primary communication channel for delivering high bandwidth data streams from mobile devices 101 to base station 200. In one embodiment, the upstream direction from backscatter transmit circuitry 245 is a non-communicative path, but merely outputs EM radiation 212 as a sort of radar signal. In other embodiments, backscatter transmit circuitry 245 can modulate data onto EM radiation 212 to provide an upstream broadcast data path to mobile devices 101. Backscatter transmit circuitry 245 can output EM radiation 212 having a variety of different frequencies such as 915 MHz, 2.45 GHz, 5.8 GHz, 61.25 GHz, or otherwise. Backscatter receive circuitry 250 implements the downstream path from mobile devices 101 and operates by demodulating the backscatter signal reflected by mobile devices 101. In essence, backscatter receive circuitry 250 is demodulating the received radar signature reflected from mobile devices 101. The radar signature or backscatter signal may be modulated using a variety of different techniques and symbol constellations including, BPSK, BASK, QAM or otherwise. As such, backscatter receive circuitry 250 includes the requisite filters, mixers, amplifiers, decoders, framers, and the like to demodulate/decode the appropriate modulation scheme. Although FIG. 2 illustrates separate transmit and receive antennas, in other embodiments, a single backscatter antenna may be used to both transmit EM radiation 212 and receive the backscatter signal 217. In yet another embodiment, multiple transmit and receive antennas may be used along with beam forming and tracking techniques.

Side channel transceiver(s) 240 represent one or more wireless communication channels that do not use backscatter communications. For example, side channel transceiver(s) 240 may be implemented using a WiFi transceiver, a Bluetooth transceiver, an infrared transceiver, or other standardized/proprietary wireless communication systems. Side channel transceiver 240 facilitates out-of-band communications with mobile devices 101. To conserve power, side channel transceiver 240 is well-suited for low bandwidth control signaling with mobile devices 101 to setup, teardown, or otherwise manage wireless communication sessions with mobile devices 101. The side channel transceiver 240 may also provide a network connection to the Internet or other consumer products (e.g., network attached storage, etc.) for base station 200.

Wired interface(s) 230 may include any number of wired communication ports. For example, wired interfaces 230 may include an Ethernet controller, a universal serial bus ("USB") port, or otherwise. The Ethernet controller may provide a network connection as well.

Display adaptor 225 includes a video adaptor circuitry for outputting screen images to display terminal 102. The output port of display adaptor 225 may include an HDMI cable, a VGA connector, a S-video cable, a composite video cable, component video cable, or otherwise.

Power regulator 235 provides a wired power connection for powering the internal components of base station 200. Since base station 235 is a wired device, it is not constrained by a limited power budget like mobile devices 101. Backscatter communications leverage this asymmetric power budget by pushing the power hungry generation of EM radiation 212 into base station 200 while mobile device 101 operate by reflecting EM radiation 212 (not independently generating radiation) generated at base station 200.

Control circuitry 220 is the operational brains of base station 200. It includes logic 255 for coordinating the operation of the other functional components and includes a processor for computational executions. Logic 255 may include hardware logic or software/firmware instructions stored on one or more memory devices. For example, logic 255 may include instructions for establishing a wireless communication session with one or more mobile devices 101, configuring and managing the wireless communication sessions, and terminating the wireless communication sessions.

Figure 3:
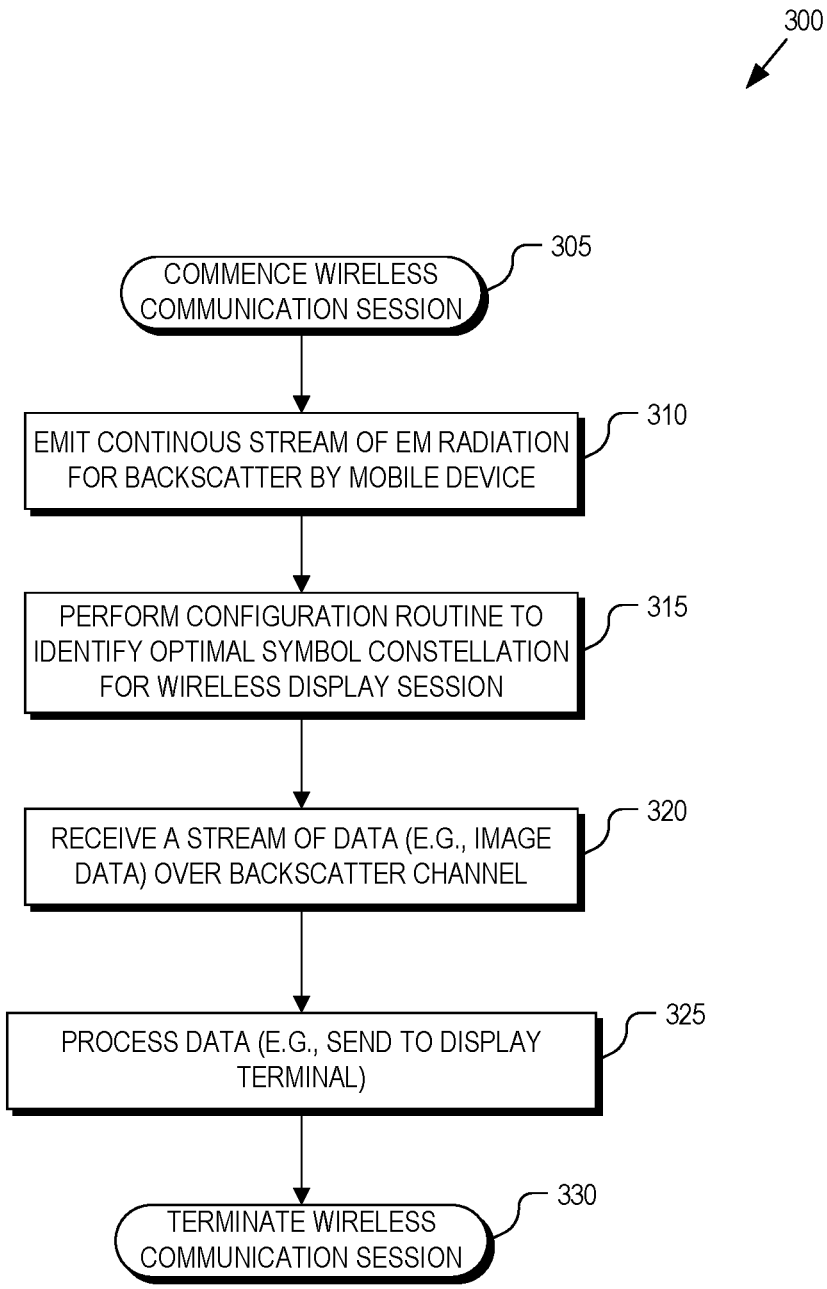
FIG. 3 is a flow chart illustrating base station side processing for wirelessly streaming data from a mobile device, in accordance with an embodiment of the disclosure.

FIG. 3 is a flow chart illustrating a process 300 performed by base station 200 for wirelessly streaming data from mobile devices 101, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, a wireless communication session is established between base station 200 and one of mobile devices 101. In one embodiment, base station 200 may periodically emit a beacon pulse of EM radiation 212 to alert mobile devices 101 of its presence. Subsequently, the control signaling used to establish a given wireless communication session may be conveyed over an out-of-band side channel using side channel transceivers 240. In other embodiments, the control signal may be partially or entirely in-band over the backscatter channel. Establishing a wireless communication session may include one or more of assigning a session reference number, determining display privileges for the mobile device 101, allocating memory for the streaming data, establishing a timeshare allocation, exchanging cryptographic keys, etc.

Once the wireless communication session has been commenced, base station 200 commences emitting a continuous stream of EM radiation 212 for modulation and backscatter by the mobile device (process block 310). In a timesharing embodiment, the continuous stream of EM radiation 212 may be continuous for fixed periods of time. Timesharing may include timesharing the backscatter channel between multiple backscatter devices or timesharing an antenna on a given mobile device 101 that is used for both backscatter communications and active emission communications with, for example, side channel transceivers 240.

In a process block 315, base station 200 may perform a configuration routine in cooperation with the mobile device to identify an optimal symbol constellation for encoding the backscatter channel during the wireless communication session. This configuration routine may be part of establishing the wireless communication session. For example, the mobile device may encode a configuration data set with a series of different symbols while base station 200 analyzes the signal quality associated with the various different symbols. This configuration routine may continue until base station 200 identifies a preferred symbol constellation that maximize SNR or data throughput. The identified symbol constellation may then be used for the remainder of the wireless communication session, for a fixed period of time when the configuration routine is automatically re-executed, or until the signal quality drops below a threshold (e.g., threshold bit error rate). In one embodiment, the configuration routine is executed in cooperation with the side channel signaling to facilitate the processes. Execution of the configuration routine to dynamically select a symbol constellation for encoding data over the backscatter channel is optional. A fixed symbol constellation may also be used.

Once the wireless communication session has been established, base station 200 can commence receiving streaming data (e.g., a display data, media files, etc.) over the backscatter channel via backscatter signal 217 from a mobile device (process block 320). In an example where the data is a screen image or a video file, it can be sent directly to display adaptor 225 for display on display terminal 102 (process block 325). If the screen image or video file is compressed, control circuitry 220 may include a decoder for uncompressing the display data prior to forwarding it to display adaptor 225 (process block 325). In other embodiments, the data may be sent over wired interfaces 230 or side channel transceiver 240 by base station 200 for delivery to a remote device via a connected network.

Once receipt of the data has completed, base station 200 ceases the continuous output of EM radiation 212 and the wireless communication session is terminated (process block 330). In one embodiment, control signaling for terminating the wireless communication session may be executed out-of-band over side channels (e.g., Bluetooth or WiFi), or using a special in-band termination sequence that is recognized by base station 200.

Figure 4:
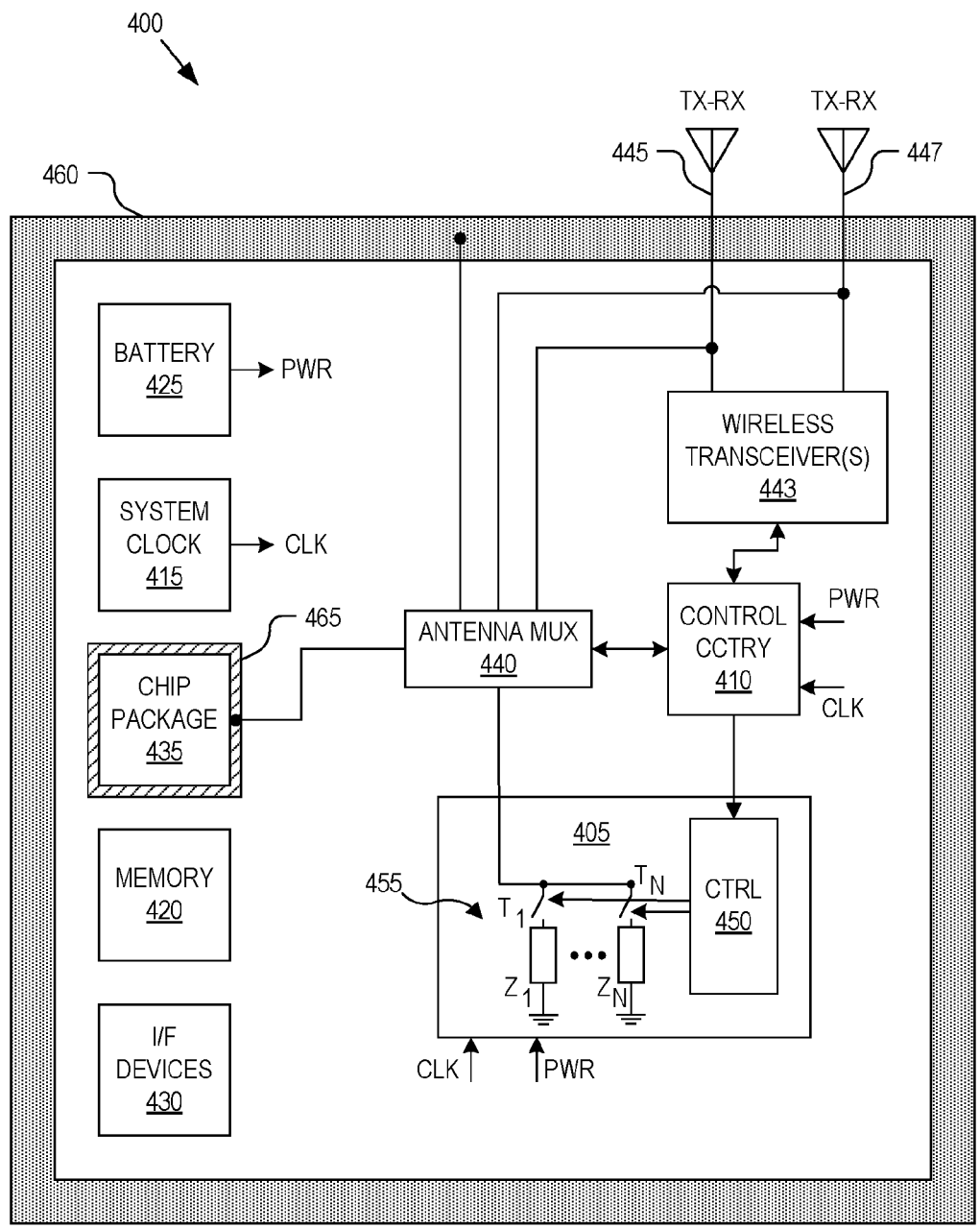
FIG. 4 is a functional block diagram illustrating a mobile device including a backscatter tag for wirelessly streaming data to a base station using shared antennas, in accordance with an embodiment of the disclosure.

FIG. 4 is a functional block diagram illustrating a mobile device 400 including a backscatter tag 405 for wirelessly streaming data to base station, in accordance with an embodiment of the disclosure. Mobile device 400 is one possible implementation of one of mobile devices 101 and may represent at mobile phone, a head wearable display, a wrist watch, a tablet, a laptop, a body wearable device, an implantable device, or otherwise. The illustrated embodiment of mobile device 400 includes backscatter tag 405, control circuitry 410, a system clock 415, memory 420, a battery 425, user interface(s) 430, a chip package 435, an antenna multiplexor 440, wireless transceiver(s) 443, antennas 445 and 447, and conductive frame 460. The illustrated embodiment of backscatter tag 405 includes an adjustable load impedance module 455 including load impedances Z1 to ZN and a backscatter controller 450. The illustrated embodiment of chip package 435 includes lead frame 465.

Backscatter tag 405 is the primary communication channel for delivering high bandwidth data streams from mobile device 400 to base station 103. Backscatter tag 405 is a relatively inexpensive and small item that can be integrated into mobile devices 101. Backscatter tag 405 operates by modulating the radar cross-section of one or more elements within mobile device 400 that can operate as a backscatter antenna. Antenna multiplexer 440 operates to selectively couple the adjustable load impedance module 455 of backscatter tag 405 to any number of antenna elements within mobile device 400. These elements need not be operated exclusively as backscatter antennas, but rather may be preexisting physical elements within mobile device 400 that serve other purposes than just as a backscatter antenna. This multipurpose, antenna sharing design significantly eases the complexity of including an additional wireless transmitter into space constrained mobile devices, since existing antenna elements are reused. This is made possible by foregoing power harvesting and instead powering and clocking backscatter tag 405 using the primary system battery 425 and system clock 415.

In the illustrated embodiment, antenna multiplexor 440 couples to antennas 445 and 447, conductive frame 460 of mobile device 400, and lead frame 465 of chip package 435. Although not illustrated, antenna multiplexor 440 may also couple to a conductive trace on a circuit board within mobile device 400 (e.g., power line running from battery 425 or a signal path running between any of the functional modules illustrated in FIG. 4). Antenna multiplexor 440 serves to selectively couple adjustable load impedance module 455 of backscatter tag 405 to anyone of these elements under the influence of control circuitry 410.

Backscatter tag 405 operates to module the radar cross-section of an antenna element within mobile device 400 by modulating a load impedance selectively coupled to the antenna element. In the illustrated embodiment, backscatter tag 405 modulates the load impedance of the coupled antenna by selectively coupling (e.g., via switches T1 to TN) load impedances Z1 to ZN to the shared backscatter antenna element under the influence of backscatter controller 450. This switching of the load impedances is a relative small power operation and backscatter tag 405 does not generate any EM radiation of its own. Backscatter controller 450 operates by receiving a data stream input from control circuitry 410 and using the data stream input to modulate the impedances of the connected backscatter antenna element. Various other techniques for modulating the radar cross section of mobile device 400 may also be implemented. For example, adjustable load impedance module 455 may include one or more variable impedance transistors, diodes with adjustable biases, or otherwise.

Wireless transceiver(s) 443 represent one or more wireless communication channels that do not use backscatter communications. For example, side-channel transceiver(s) 443 may be implemented using a WiFi transceiver, a Bluetooth transceiver, an infrared transceiver, a cellular transceiver, or other standardized/proprietary wireless communication systems. Wireless transceiver 443 facilitates out-of-band communications with base station 103. To conserve power, wireless transceiver(s) 443 are well-suited for low bandwidth control signaling with base station 103 to setup, teardown, or otherwise manage wireless communication sessions with mobile device 400. The wireless transceiver(s) 443 may also provide a network connection to the Internet or other consumer products (e.g., network attached storage, etc.).

As illustrated, mobile device 400 may include a variety of other functional elements for the regular operation of mobile device 400. These include control circuitry 410 (e.g., microprocessor), memory 420 (e.g., RAM and ROM), and interface devices 430 (e.g., a touch screen, mechanical buttons, capacitive sense buttons, wired communication ports, a display, etc.). Mobile device 400 includes a system clock 415 for synchronous operations and a battery 425 having a limited power budget. Other functional components of typical mobile devices may also be included, but are not illustrated so as not to clutter FIG. 4 and obscure the relevant details.

Control circuitry 410 is the operational brains of mobile device 400. It includes logic for coordinating the operation of the other functional components and includes a processor to perform computational executions. This logic may include hardware logic or software/firmware instructions stored on one or more memory devices. For example, the logic may include instructions for establishing a wireless communication session with base station 103, configuring and managing the wireless communication sessions, terminating the wireless communications sessions, manipulating antenna multiplexor to select a given antenna element for backscatter communication, time sharing the antenna elements, etc.

Figure 5:
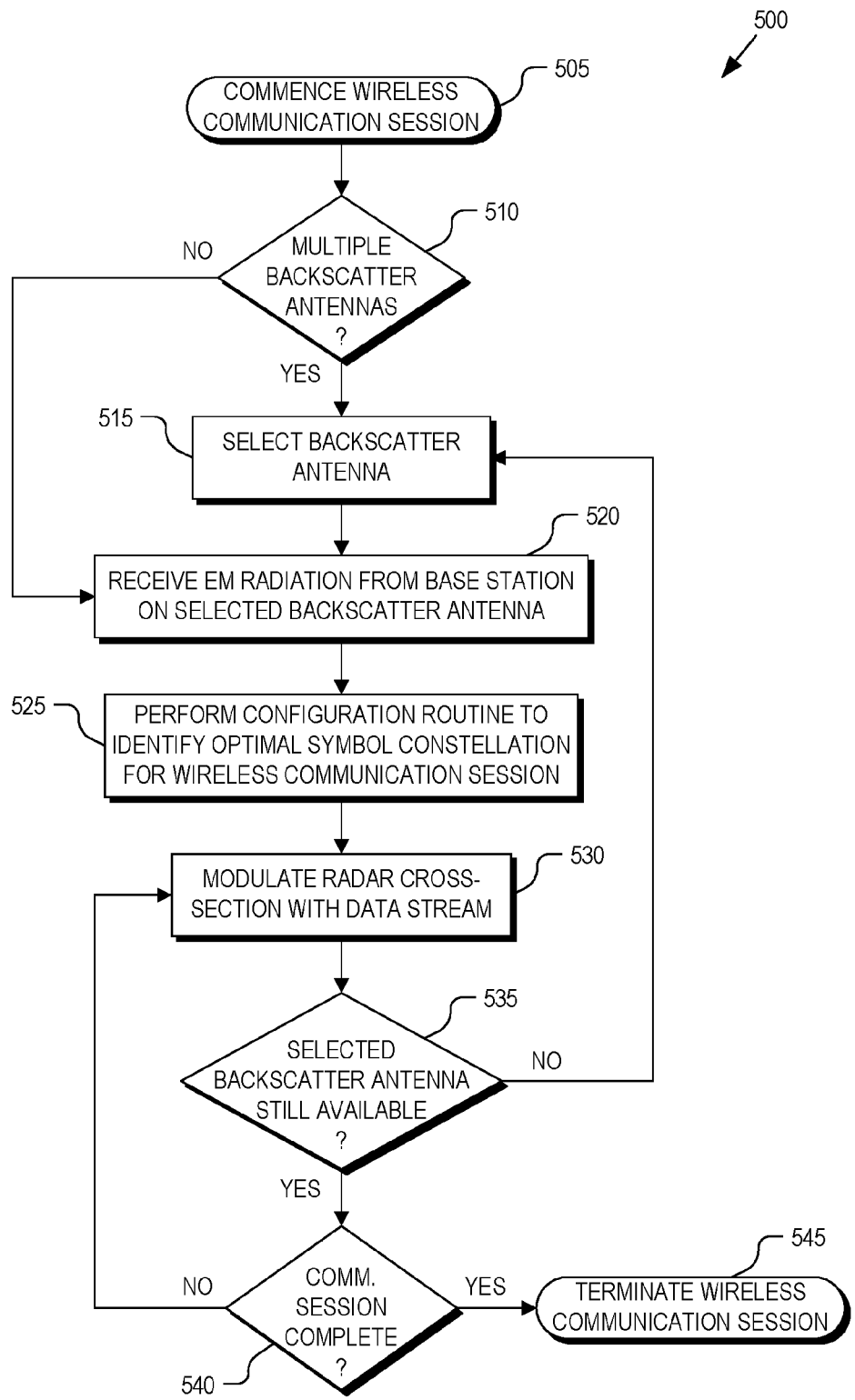
FIG. 5 is a flow chart illustrating mobile side processing for wirelessly streaming data to a base station over a backscatter channel using a shared antenna, in accordance with an embodiment of the disclosure.

FIG. 5 is a flow chart illustrating a process 500 performed by mobile device 400 for wirelessly streaming data to base station 103, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel.

In a process block 505, a wireless communication session between mobile device 400 and base station 103 is commenced. In one embodiment, the wireless communication session is commenced using side channel control signaling over wireless transceivers 443. In another embodiment, the wireless communication session is commenced by modulating a control signal response onto a beacon pulse of EM radiation emitted by base station 103. Establishing a wireless communication session may include one or more of providing address information to base station 103, negotiating privileges with base station 103, negotiating a data rate, establishing a timeshare allocation, exchanging cryptographic keys to prevent eavesdropping, or otherwise.

If mobile device 400 includes multiple antennas (decision block 510), then process 500 continues to a process block 515. In process block 515, control circuitry 410 selects an antenna from the multiple available antennas for temporary use as a backscatter antenna for the backscatter communications. In one embodiment, the particular antenna may be selected based upon a static preference list that ranks the antennas according to a default preference hierarchy. In another embodiment, link quality tests may be executed on each of the antennas to identify a preferred antenna. In one embodiment, the list of available antennas may also be dependent upon which antennas are currently available for backscatter communication. For example, one or both of antennas 445 and 447 may be currently used by wireless transceivers 443 and therefore not currently available for backscatter communications. In the event of a preferred antenna being occupied by another wireless transceiver 443, then control circuitry 410 may select the next antenna in the preference hierarchy that is currently available. Once an available antenna is identified, control circuitry 410 selects the antenna via control signaling to antenna multiplexer 440 to couple the selected antenna to backscatter tag 405 and adjustable load impedance module 455.

Once the wireless communication session has been commenced, mobile device 400 also begins receiving a continuous stream of EM radiation from base station 103 (process block 520). In a timesharing embodiment, the continuous stream of EM radiation may be continuous for fixed periods of time.

In a process block 525, a configuration routine may be performed in cooperation with base station 103 to identify an optimal symbol constellation for encoding the backscatter channel during the wireless communication session. This configuration routine may be part of establishing the wireless communication session. For example, mobile device 400 may encode a configuration data set with a series of different symbols while base station 103 analyzes the signal quality associated with the various different symbols. This configuration routine may continue until mobile device 400 is notified by base station 103 that a preferred symbol constellation that maximizes SNR or data throughput has been identified and conveyed to mobile device 400. The identified symbol constellation may then be used for the remainder of the wireless communication session, for a fixed period of time when the configuration routine is automatically re-executed, until the signal quality drops below a threshold (e.g., threshold bit error rate), or until the selected antenna is changed for the backscatter communications. In one embodiment, the configuration routine is executed in cooperation with the side channel signaling to facilitate the process. Execution of the configuration routine to dynamically select a symbol constellation for encoding data over the backscatter channel is optional. A fixed symbol constellation may also be used or a different fixed symbol constellation may be associated with each antenna used for backscatter communications.

Once the wireless communication session has been established with a selected backscatter antenna, mobile device 400 can commence transmitting data over the backscatter channel. In process block 530, backscatter tag 405 modulates the radar cross-section of the selected antenna to encode the data onto the backscatter channel. In one embodiment, the radar cross-section of the mobile device 400 is modulated (thereby modulating the radar signature received at the base station) by modulating the impedance load on the selected backscatter antenna using the data stream.

As long as the selected backscatter antenna remains available during the wireless communication session (decision block 535), backscatter communications can continue until completion of the wireless communication session (decision block 540). However, if the selected antenna becomes unavailable (decision block 535), then process 500 loops back to process block 515 to select another available antenna. A selected backscatter antenna could become unavailable if, for example, the current antenna is either antenna 445 or 447 and one of wireless transceivers 443 transitions from an idle or disabled state to an active or enabled state. In other words, in some embodiments, wireless transceivers 443 may be given a higher access privileged to antennas 445 or 447. In other embodiments, control circuitry 410 may reserve a selected antenna during the wireless communication session and block access to the selected antenna by wireless transceivers 443 for a period of time or until completion of the wireless communication session in process block 545. In one embodiment, control signaling for terminating the wireless communication session may be executed out-of-band over side channels (e.g., Bluetooth or WiFi), or using a special in-band termination sequence that is recognized by base station 103.

Figure 6:
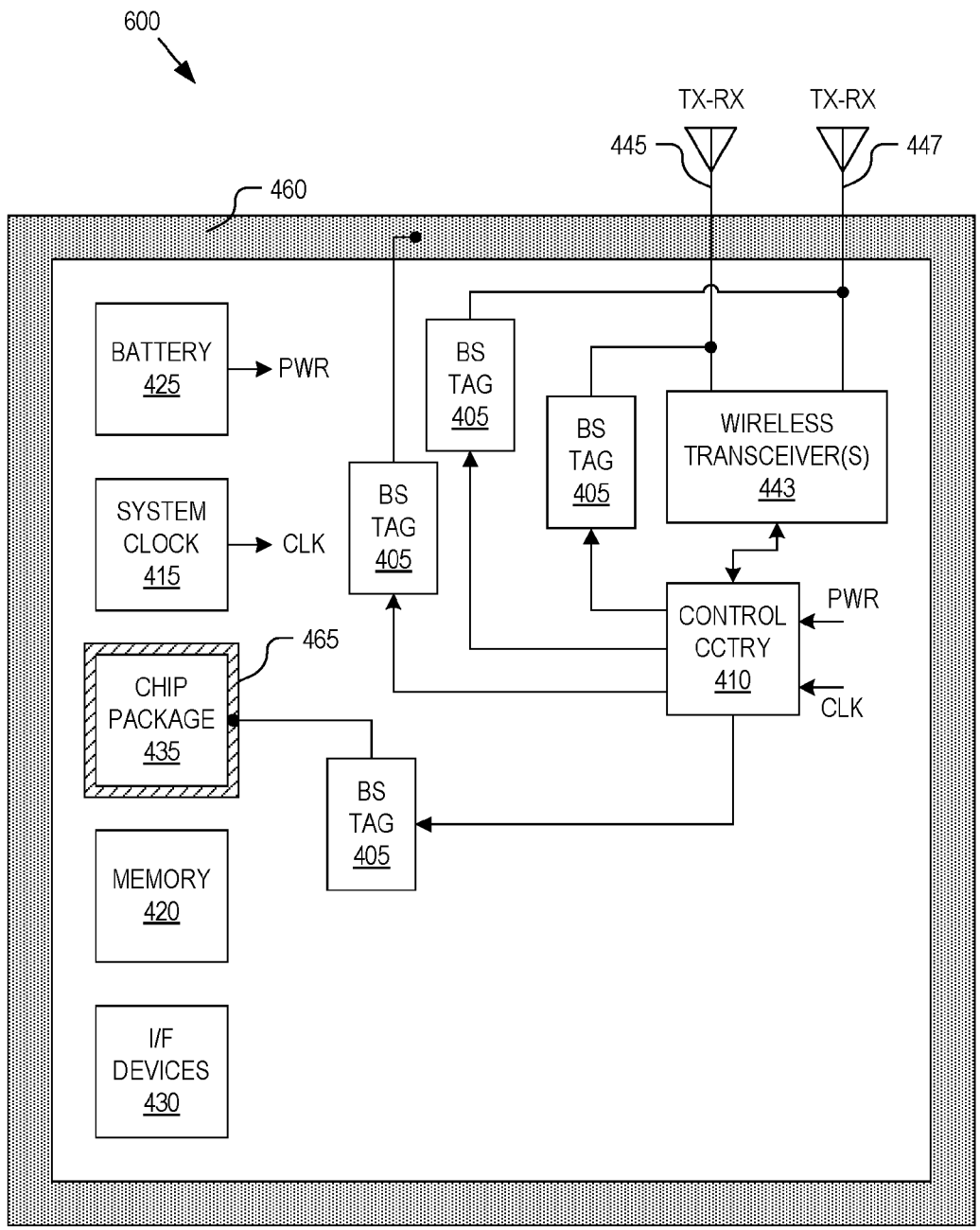
FIG. 6 is a functional block diagram illustrating a mobile device including multiple backscatter tags each coupled to a different antenna, in accordance with an embodiment of the disclosure.

FIG. 6 is a functional block diagram illustrating a mobile device 600 including multiple backscatter tags 405 each coupled to a different antenna, in accordance with an embodiment of the disclosure. Mobile device 600 is similar to mobile device 400 expect that instead of using antenna multiplexer 440 to couple multiple antenna elements to a single backscatter tag 405, each antenna element 445, 447, 460, and 465 is associated with and coupled to a separate instance of backscatter tag 405. The individual backscatter tags 405 can be separately enable or disabled to use their associated antenna element as a backscatter antenna for the backscatter communication session.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of wirelessly communicating data, the method comprising:
    receiving electromagnetic ("EM") radiation incident upon an antenna of a mobile device from a base station, wherein the antenna is an element of the mobile device that serves an additional purpose than just as a reflective antenna for backscatter communications, wherein the additional purpose of the antenna includes one of a conductive frame of the mobile device, a lead frame of a chip package within the mobile device, or a conductive trace on a circuit board of the mobile device;
    modulating a radar cross-section of the antenna between two or more states using a backscatter tag coupled to the antenna;
    encoding the data onto a backscatter channel of the EM radiation via the modulation of the radar cross-section; and
    transmitting the data to the base station over the backscatter channel.

2. The method of claim 1, further comprising:
    time sharing the antenna between the backscatter tag and the additional purpose.

3. The method of claim 2, wherein the time sharing comprises alternating usage of the antenna between the backscatter tag and the additional purpose for predetermined durations.

4. The method of claim 1, further comprising:
    selecting the antenna from a plurality of antennas of the mobile device prior to modulating the radar cross-section of the antenna.

5. The method of claim 4, wherein selecting the antenna comprises:
    determining which of the plurality of antennas are currently available antennas for use by the backscatter tag; and
    selecting a preferred antenna for the backscatter communications from the currently available antennas.

6. The method of claim 4, further comprising:
    performing a configuration routine to identify a subset of available impedances that improve a signal-to-noise ratio ("SNR") of the backscatter channel; and
    using the identified subset of available impedances as a symbol constellation for encoding the data on the backscatter channel during the wireless display session.

7. The method of claim 6, further comprising:
    interrupting the backscatter channel when the antenna becomes unavailable;
    selecting a backup antenna from the plurality of antennas;
    performing another configuration routine to identify a new subset of the available impedances that improve the SNR of the backscatter channel for the backup antenna; and
    continuing to transmit the data to the base station over the backscatter channel using the new subset of available impedances as the symbol constellation for encoding the data.

8. The method of claim 1, wherein the mobile device comprises one of a mobile phone, a head wearable display, a wrist watch, body-mountable devices, a tablet, a body-implantable device, or a laptop.

9. The method of claim 1, further comprising:
    establishing a wireless communication session between the mobile device and the base station for communications over the backscatter channel, wherein control signaling for managing the wireless communication session is conveyed via a wireless side channel that does not use backscatter communications.

10. The method of claim 1, further comprising:
    powering the modulation of the radar cross-section of the antenna of the mobile device using a primary battery of the mobile device, wherein the radar cross-section is modulated between the two or more states by modulating an impedance load on the antenna.

11. At least one non-transitory machine-readable storage medium that provides instructions that, when executed by a mobile device, will cause the mobile device to perform operations comprising:
    receiving electromagnetic ("EM") radiation incident upon an antenna of a mobile device from a base station, wherein the antenna is an element of the mobile device that serves an additional purpose than just as a reflective antenna for backscatter communications;
    selecting the antenna from a plurality of antennas of the mobile device prior to modulating a radar cross-section of the antenna;
    modulating the radar cross-section of the antenna between two or more states;
    encoding data onto a backscatter channel of the EM radiation via the modulating; and
    transmitting the data to the base station over the backscatter channel.

12. The at least one non-transitory machine-readable storage medium of claim 11, wherein selecting the antenna comprises:
    determining which of the plurality of antennas are currently available antennas for use by the backscatter tag; and
    selecting a preferred antenna for the backscatter communications from the currently available antennas.

13. The at least one non-transitory machine-readable storage medium of claim 11, further providing instructions that, when executed by the mobile device, will cause the mobile device to perform further operations, comprising:
    performing a configuration routine to identify a subset of available impedances that improve a signal-to-noise ratio ("SNR") of the backscatter channel; and using the identified subset of available impedances as a symbol constellation for encoding the data on the backscatter channel during the wireless display session.

14. The at least one non-transitory machine-readable storage medium of claim 13, wherein the additional purpose of the antenna comprises one of a conductive frame of the mobile device, a lead frame of a chip package within the mobile device, or a conductive trace on a circuit board of the mobile device.

15. A mobile device, comprising:
an active wireless transceiver coupled to drive a first antenna to emit radiation during an active emission communication session;
a backscatter tag including an adjustable load impedance module that is selectively coupled to the first antenna to modulate a radar cross-section of the first antenna between two or more states to encode data onto a backscatter channel when electromagnetic ("EM") radiation is incident upon the first antenna during a backscatter communication session;
control circuitry coupled to share the first antenna between the backscatter tag for backscatter communications and the active wireless transceiver for active emission communications; and
an antenna multiplexor coupled between the backscatter tag and a plurality of antennas including the first antenna, the antenna multiplexor coupled to the control circuitry to selectively couple any of the plurality of antennas of the mobile device to the adjustable load impedance module of the backscatter tag for use during the backscatter communications.

16. The mobile device of claim 15, wherein the plurality of antennas further includes a second antenna coupled to another active wireless transceiver.

17. The mobile device of claim 15, wherein the plurality of antennas further includes at least one of a frame of the mobile device, a lead frame of a chip package within the mobile device, or a conductive trace on a circuit board of the mobile device.

18. The mobile device of claim 15, further comprising:
a plurality of antennas including the first antenna; and
a plurality of backscatter tags including the backscatter tag, wherein each of the plurality of backscatter tags is coupled to a corresponding one of the plurality of antennas to selectively modulate a radar cross-section of a corresponding one of the antennas for backscatter communications.

19. A mobile device, comprising:
an active wireless transceiver coupled to drive a first antenna to emit radiation during an active emission communication session;
a backscatter tag including an adjustable load impedance module that is selectively coupled to the first antenna to modulate a radar cross-section of the first antenna between two or more states to encode data onto a backscatter channel when electromagnetic ("EM") radiation is incident upon the first antenna during a backscatter communication session;
control circuitry coupled to share the first antenna between the backscatter tag for backscatter communications and the active wireless transceiver for active emission communications;
a plurality of antennas including the first antenna; and
a plurality of backscatter tags including the backscatter tag, wherein each of the plurality of backscatter tags is coupled to a corresponding one of the plurality of antennas to selectively modulate a radar cross-section of a corresponding one of the antennas for backscatter communications.

* * * * *